United States Patent [19]

Yang

[11] Patent Number: 5,570,970
[45] Date of Patent: Nov. 5, 1996

[54] TUBE AND CONNECTOR ARRANGEMENT FOR A LIGHTING FIXTURE

[76] Inventor: Chih-Te Yang, No. 20, Lane 132, Sec. 1, Chang Mei Road, Changhua City, Taiwan

[21] Appl. No.: 255,243

[22] Filed: Jun. 7, 1994

[51] Int. Cl.$^6$ ........................ F16B 9/00
[52] U.S. Cl. ............ 403/374; 403/332; 403/361; 403/263; 403/359
[58] Field of Search ................ 403/374, 332, 403/361, 359, 263, 242, 245, 264, 354, 164, 165

[56] References Cited

U.S. PATENT DOCUMENTS

| | | | |
|---|---|---|---|
| 4,697,949 | 10/1987 | Perez | 403/361 |
| 5,342,137 | 8/1994 | Peng | 403/164 |
| 5,358,352 | 10/1994 | Klarhorst | 403/104 |

*Primary Examiner*—Anthony Knight
*Attorney, Agent, or Firm*—Merchant, Gould, Smith, Edell, Welter & Schmidt, P.A.

[57] ABSTRACT

A tube and connector arrangement for a lighting fixture, including a tube having two symmetrical rails raised from the inside wall of the tube along the length, and a connector having a longitudinal center through hole for passing the electric wire of the lighting fixture and a stub rod within a circular recess on the periphery of the connector perpendicular to the longitudinal axis of the connector, the stub rod being fitted into one end of the tube and having a round hole communicated with the longitudinal center through hole for passing the electric wire and two longitudinal grooves on the outside wall at two opposite sides respectively made deeper toward the outer end and engaged with the symmetrical rails of the tube.

1 Claim, 4 Drawing Sheets

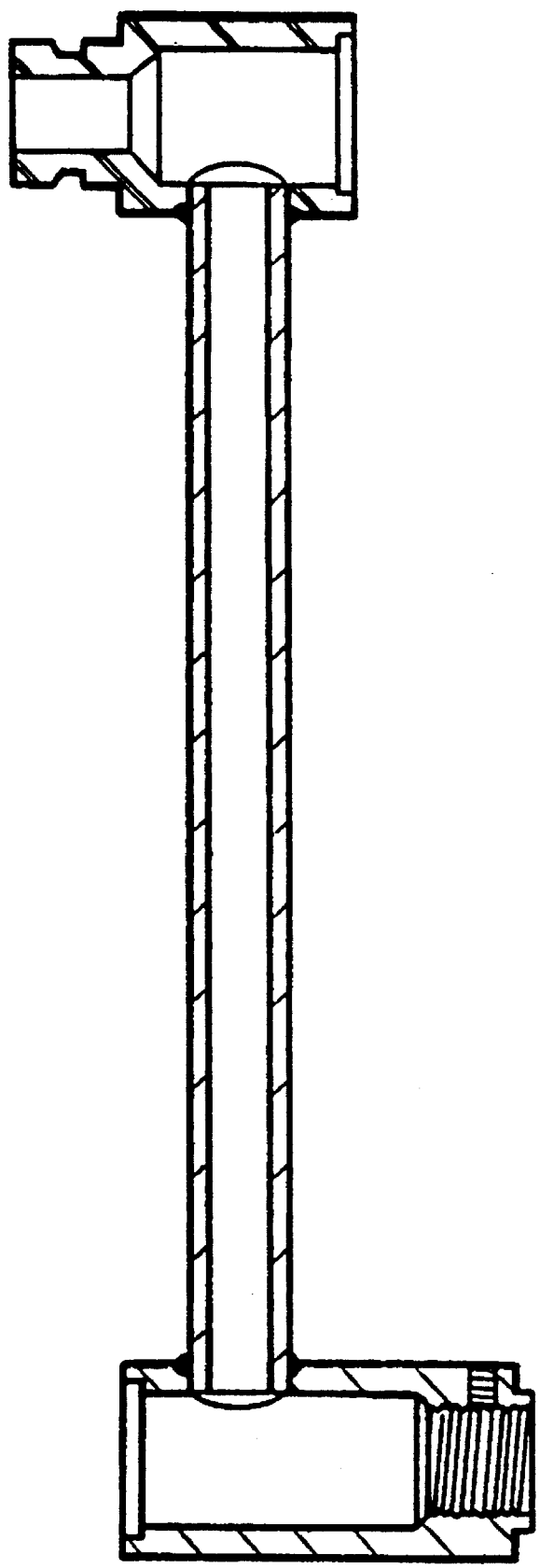
FIG. IA
PRIOR ART

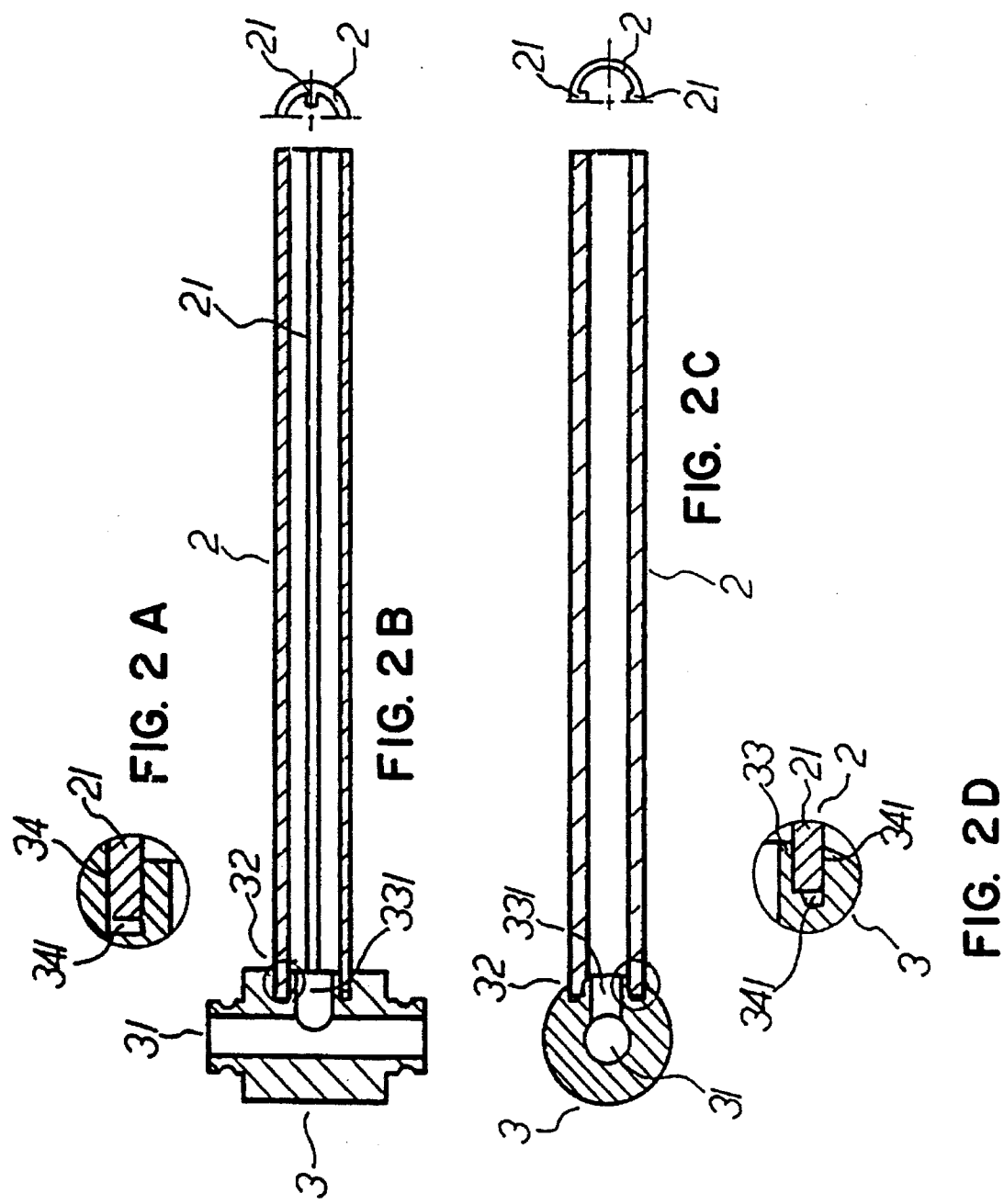

TUBE AND CONNECTOR ARRANGEMENT FOR A LIGHTING FIXTURE

BACKGROUND OF THE INVENTION

The present invention relates to a tube and connector arrangement for a lighting fixture which is suitable for a mass production to greatly reduce the cost of the lighting fixture and improve its quality.

In the production of lighting fixtures, the frame tubes A and connectors B (see FIGS. 1 and 1A) are commonly fastened together through a welding process. This complicated procedure greatly increases the cost of the lighting fixtures. When the welding flux is heated during the welding, a harmful gas will be produced and may be drawn into the lungs of the welder. Because the welder must watch the flame of the welding torch during the welding, the welder's eyes may be damaged easily. After the welding, the surface around the connecting area between the tube and the connector is destroyed and must be surface-treated again. Furthermore, because the welding process is executed by labor, it is difficult to control the quality.

SUMMARY OF THE INVENTION

The present invention has been accomplished to provide a tube and connector arrangement which eliminates the aforesaid problems.

According to the present invention, the tube and connector arrangement comprises a tube, which has two symmetrical rails raised from the inside wall thereof along the length, and a connector, which has a longitudinal center through hole for passing the electric wire of the lighting fixture and a stub rod within a circular recess on the periphery thereof perpendicular to the longitudinal axis thereof. The stub rod has a round hole communicated with the longitudinal center through hole of the connector for passing the electric wire, and two longitudinal grooves on the outside wall at two opposite sides respectively made deeper toward the outer end. When the tube is inserted into the circular recess, the stub rod fits into the tube causing the rails of the tube engaged with the longitudinal grooves. Because the rails of the tube are engaged with the longitudinal grooves on the stub rod, the tube is prohibited from rotary motion relative to the stub rod of the connector. The longitudinal grooves are respectively made deeper from the respective inner end toward the respective outer end, and therefore the connector and the tube are held down tight when they are connected together. The aforesaid arrangement allows the connector and the tube to be respectively surface-finished before connection. When assembled, the surface of the connector and the surface of the tube are maintained intact.

BRIEF DESCRIPTION OF THE DRAWINGS

FIG. 1A is an assembly view in section of the tube and the connectors shown in FIG. 1;

FIG. 2A is an cross-sectional view taken on line A—A of FIG. 2;

FIG. 2B is an assembly veiw in section of the present invention shown in FIG. 2A;

FIG. 2C is an cross-sectional view taken on line B—B of FIG. 2; and

FIG. 2D is assembly view in section of the present invention shown in FIG. 2C.

DETAILED DESCRIPTION OF THE PREFERRED EMBODIMENT

Figure 1:
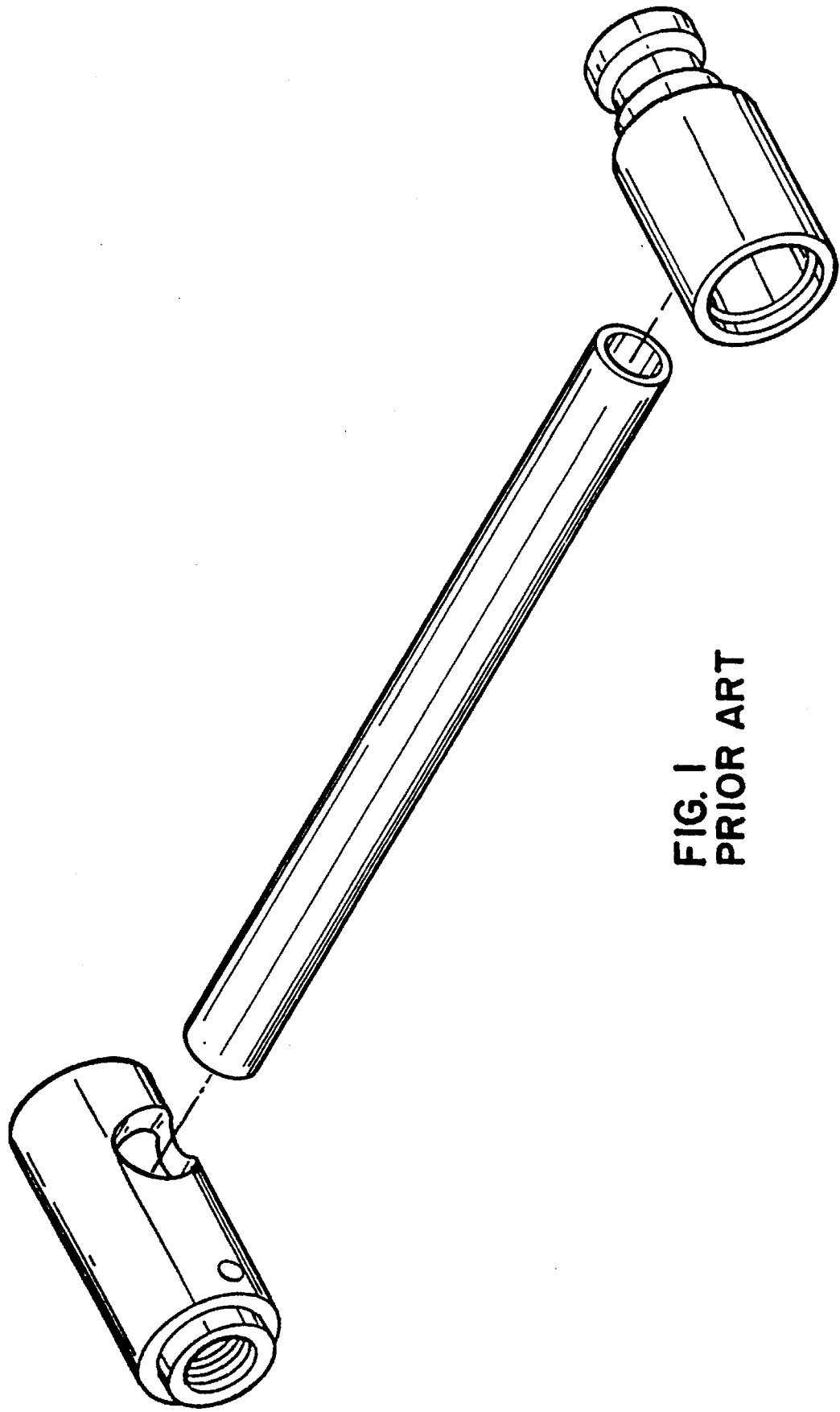
FIG. 1 is a dismantled view of a tube and two connectors for a lighting fixture according to the prior art.
Figure 2:
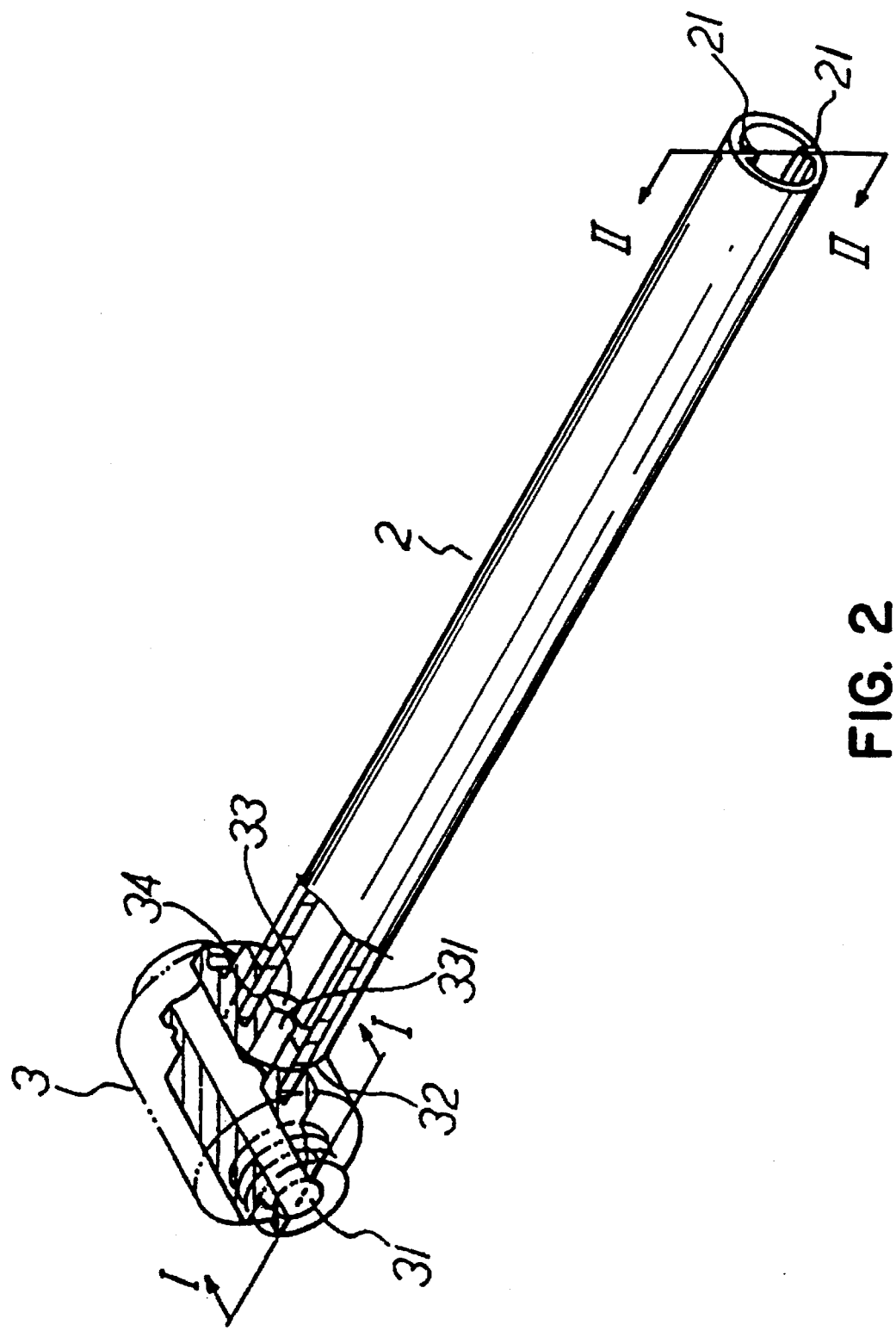
FIG. 2 is a dismantled view of the present invention.

Referring to FIGS. 2 2A,2B,2C and 2D, the present invention includes a tube 2 and a connector 3. The tube 2 is made through an extruding process, having two symmetrical rails 21 raised from the inside wall thereof along the length. The connector 3 is made of tubular shape and comprising a longitudinal center through hole 31, through which the electric wire passes, a circular recess 32 at one side, and a stub rod 33 concentrically disposed within the circular recess 32. The stub rod 33 has a round hole 331 through the longitudinal center thereof in communication with the longitudinal center through hole 31 for passing the electric wire, and two longitudinal grooves 34 on the outside wall thereof at two opposite sides. The longitudinal groove 34 is made gradually deeper from the inner end 341 toward the outer end. When the rails 21 are respectively aimed at the longitudinal grooves 34, the tube 2 is inserted into the circular recess 32, causing the stub rod 33 fitted into the tube 2 and the rails 21 engaged into the longitudinal grooves 34. Because the depth of the longitudinal grooves 34 is made gradually deeper toward the outer end, the connector 3 and the tube 2 are joined together tightly when the tube 2 is inserted into the circular recess 32.

What is claimed is:

1. A tube and connector arrangement for a lighting fixture, comprising:

a tube;

a connector connected to said tube for connecting parts of the lighting fixture, wherein said tube has two symmetrical rails raised from an inside wall along a length of the tube; said connector comprises a longitudinal center through hole, through which an electric wire of the lighting fixture passes, a circular recess at one side, which receives either end of said tube, and a stub rod concentrically disposed within said circular recess, which fits into one end of said tube, said stub rod having a round hole through a length of the stub rod in communication with said longitudinal center through hole for passing the electric wire and two longitudinal grooves on a periphery of the stub rod at two opposite sides respectively engaged with said symmetrical rails, a depth of either longitudinal groove being made gradually deeper from an inner end toward an outer end so that the symmetrical rails are tightly retained in the longitudinal grooves, whereby the connector and the tube are tightly joined together.

* * * * *